(12) United States Patent
Xiong (10) Patent No.: US 12,008,219 B2
(45) Date of Patent: Jun. 11, 2024

(54) USER INTERFACE PRESENTATION METHOD AND APPARATUS, COMPUTER-READABLE MEDIUM AND ELECTRONIC DEVICE

(71) Applicant: BEIJING BYTEDANCE NETWORK TECHNOLOGY CO., LTD., Beijing (CN)

(72) Inventor: Dian Xiong, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/764,521

(22) PCT Filed: Sep. 22, 2020

(86) PCT No.: PCT/CN2020/116919
§ 371 (c)(1),
(2) Date: Mar. 28, 2022

(87) PCT Pub. No.: WO2021/057738
PCT Pub. Date: Apr. 1, 2021

(65) Prior Publication Data
US 2022/0365644 A1 Nov. 17, 2022

(30) Foreign Application Priority Data
Sep. 27, 2019 (CN) .......................... 201910927686.1

(51) Int. Cl.
*G06F 3/048* (2013.01)
*G06F 3/04817* (2022.01)
(Continued)

(52) U.S. Cl.
CPC ........ *G06F 3/0484* (2013.01); *G06F 3/04817* (2013.01); *G06F 3/04886* (2013.01); *G06F 9/454* (2018.02)

(58) Field of Classification Search
CPC .... G06F 3/0484; G06F 9/454; G06F 3/04817; G06F 3/04886
See application file for complete search history.

(56) References Cited

U.S. PATENT DOCUMENTS

| 11,321,884 B1* | 5/2022 | Jindal ..................... G06T 11/60 |
| 2005/0113646 A1* | 5/2005 | Sotos ..................... A61B 7/003 |
| | | 600/300 |

(Continued)

FOREIGN PATENT DOCUMENTS

| CN | 106055332 A | 10/2016 |
| CN | 106095437 A | 11/2016 |

(Continued)

OTHER PUBLICATIONS

International Patent Application No. PCT/CN2020/116919; Int'l Written Opinion and Search Report; dated Dec. 24, 2020; 6 pages.

(Continued)

*Primary Examiner* — David E Choi
(74) *Attorney, Agent, or Firm* — BakerHostetler (57) ABSTRACT

The disclosure relates to a user interface presentation method and apparatus, a computer-readable medium and an electronic device. The method comprises: performing, according to the axis of symmetry of a to-be-flipped user interface, mirror image flipping on said user interface, so as to obtain a first interface; determining a first target element in the first interface; performing mirror image flipping on the first target element in the first interface according to the axis of symmetry of the first target element to form a second target element, so as to obtain a second interface; and presenting the second interface. Thus, the flipping of a user (Continued)

interface is realized by means of mirror image flipping, so as to adapt to reading habits of a user.

20 Claims, 8 Drawing Sheets

(51) Int. Cl.
*G06F 3/0484* (2022.01)
*G06F 3/04886* (2022.01)
*G06F 9/451* (2018.01)

(56) References Cited

U.S. PATENT DOCUMENTS

| | | |
|---|---|---|
| 2009/0303676 A1 | 12/2009 | Behar et al. |
| 2013/0217967 A1 | 8/2013 | Mohr et al. |
| 2015/0002420 A1 | 1/2015 | Koh |
| 2021/0065578 A1* | 3/2021 | Dalio ................ G09B 19/0053 |
| 2021/0249117 A1* | 8/2021 | Pan ........................ G16H 30/40 |
| 2022/0250237 A1* | 8/2022 | Nagashima ............ B25J 9/1664 |
| 2022/0365644 A1* | 11/2022 | Xiong ................. G06F 3/04886 |

FOREIGN PATENT DOCUMENTS

| | | |
|---|---|---|
| CN | 108664243 A | 10/2018 |
| CN | 111475248 A | 7/2020 |
| CN | 111479155 A | 7/2020 |
| EP | 1221650 B1 | 3/2018 |
| JP | 2005-215285 A | 8/2005 |
| JP | 2008-256964 A | 10/2008 |
| JP | 2010-039651 A | 2/2010 |
| JP | 2011-215591 A | 10/2011 |
| JP | 2011-248287 A | 12/2011 |

OTHER PUBLICATIONS

Li et al.; "FI-SURF algorithm for image copy-flip-move forgery detection"; Journal of Communications; vol. 36 No. 5; May 2015; 12 pages (contains English Abstract).

* cited by examiner

USER INTERFACE PRESENTATION METHOD AND APPARATUS, COMPUTER-READABLE MEDIUM AND ELECTRONIC DEVICE

The present application is a national phase application of PCT international patent application PCT/CN2020/116919, filed on Sep. 22, 2020, which claims priority to Chinese Patent Application No. 201910927686.1, titled "USER INTERFACE PRESENTATION METHOD AND APPARATUS, COMPUTER-READABLE MEDIUM AND ELECTRONIC DEVICE", filed on Sep. 27, 2019, with the China National Intellectual Property Administration, both of which are incorporated herein by reference in their entireties.

FIELD

The present disclosure relates to the field of electronic technology, and in particular to a method and an apparatus for displaying a user interface, and a computer-readable medium and an electronic device.

BACKGROUND

In an environment such as Arabic and Hebrew, users usually browse from right to left. Therefore, it is required to perform RTL (right to left) adaptation on a user interface of an electronic device for display. Currently, RTL adaptation is performed directly by a system operating in the electronic device. However, only some elements in the user interface are automatically adapted by the system, and the degree of adaptation for elements such as sliding buttons is very limited. The elements, that cannot be automatically adapted by the system, may only be adapted by rewriting codes. Moreover, after RTL adaptation is performed on the user interface by the system, it is required to restart the application program to display the user interface after RTL adaptation, resulting in a cumbersome process and poor user experience.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

In a first aspect, a method for displaying a user interface is provided according to the present disclosure. The method includes: performing mirror flipping on a to-be-flipped user interface around a symmetry axis of the user interface to obtain a first interface; determining a first target element in the first interface; performing mirror flipping on the first target element in the first interface around a symmetry axis of the first target element to obtain a second target element and then obtain a second interface; and displaying the second interface.

In a second aspect, an apparatus for displaying a user interface is provided according to the present disclosure. The apparatus includes: a first flipping module, a first determining module, a second flipping module, and a display module. The first flipping module is configured to perform mirror flipping on a to-be-flipped user interface around a symmetry axis of the user interface to obtain a first interface. The first determining module is configured to determine a first target element in the first interface obtained by the first flipping module. The second flipping module is configured to perform mirror flipping on the first target element in the first interface around a symmetry axis of the first target element to obtain a second target element and then obtain a second interface. The display module is configured to display the second interface obtained by the second flipping module.

In a third aspect, a computer-readable medium is provided according to the present disclosure. The computer-readable medium stores a computer program. The computer program, when executed by a processing device, causes the processing device to perform the method provided in the first aspect according to the present disclosure.

In a fourth aspect, an electronic device is provided according to the present disclosure. The electronic device includes a storage device and a processing device. The storage device stores a computer program. The processing device is configured to perform, when executing the computer program stored in the storage device, the method provided in the first aspect according to the present disclosure.

In the above technical solutions, mirror flipping is performed on the to-be-flipped user interface around the symmetry axis of the user interface to obtain the first interface, then mirror flipping is performed on the first target element in the first interface around the symmetry axis of the first target element to obtain the second interface, and then the second interface is displayed. Therefore, the user interface is flipped by performing mirror flipping to adapt to the user's reading habits, simple and easy to be implemented, without rewriting codes, saving time and labor costs, flipping the user interface without restarting an application, convenient and fast, thereby improving the user experience.

Other features and advantages of the present disclosure are to be described in detail in the following embodiments.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple devices in the embodiments of the present disclosure are only illustrative, and are not intended to limit the scope of the messages or information.

Figure 1:
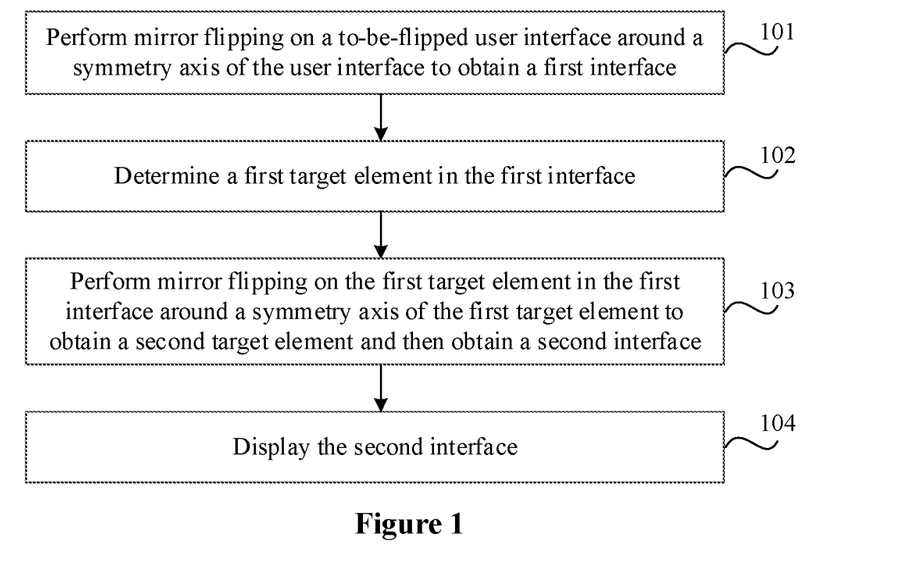
FIG. 1 is a flow chart of a method for displaying a user interface according to an exemplary embodiment.

FIG. 1 is a flow chart of a method for displaying a user interface according to an exemplary embodiment. As shown in FIG. 1, the method may include the following steps 101 to 104.

In step 101, mirror flipping is performed on a to-be-flipped user interface around a symmetry axis of the user interface to obtain a first interface.

In the present disclosure, the method may be applied to a terminal. The terminal may be, for example, a smart phone, a smart TV, a smart wearable device, and a tablet computer. The user interface may be an interface currently displayed on the display screen of the terminal. If the user wants to flip a current LTR (Left to Right) interface to an RTL interface or flip a current RTL interface to an LTR interface, the user may touch the terminal and input a flipping command. After receiving the command by the terminal, mirror flipping (that is, horizontal flipping) may be performed on the to-be-flipped user interface around a symmetry axis of the user interface to obtain a first interface. Each of elements in the to-be-flipped user interface is to changed from an original position to a target position that is symmetrical with the original position relative to the symmetry axis of the user interface. Moreover, for each of the elements, mirror flipping is performed on the element around a symmetry axis of the element. That is, for each of elements in the first interface, the element is a mirror image of a corresponding element in the to-be-flipped user interface.

Figure 2A:
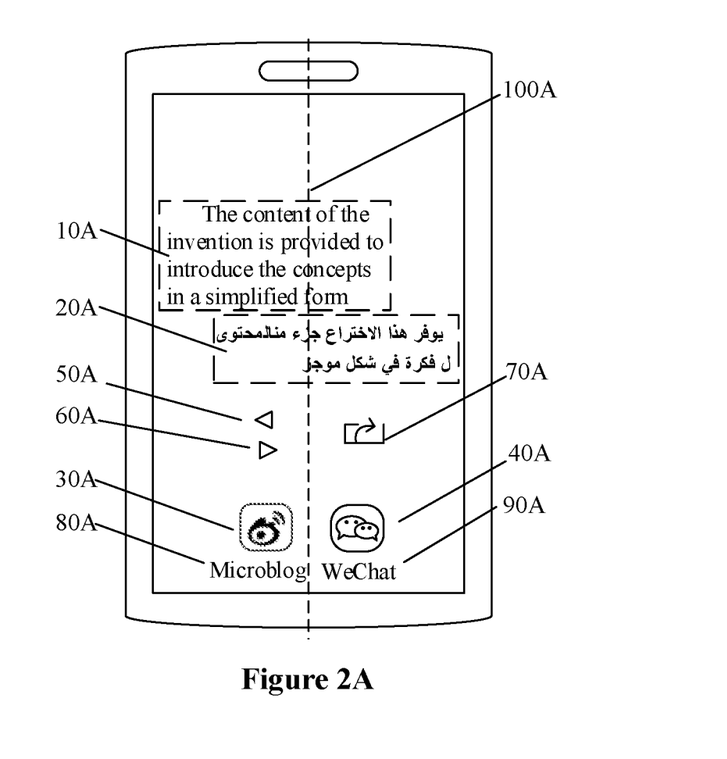
FIG. 2A is a schematic diagram of an LTR interface according to an exemplary embodiment.
Figure 2B:
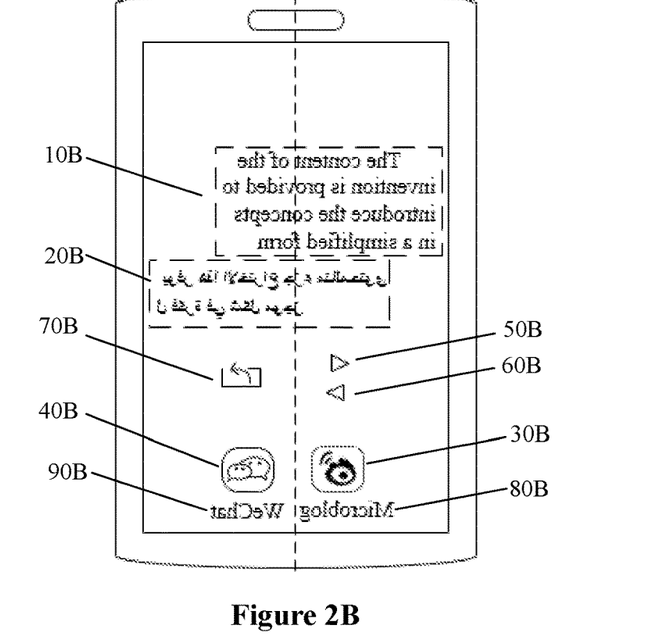
FIG. 2B is a schematic diagram of a first interface corresponding to the LTR interface shown in FIG. 2A.
Figure 2C:
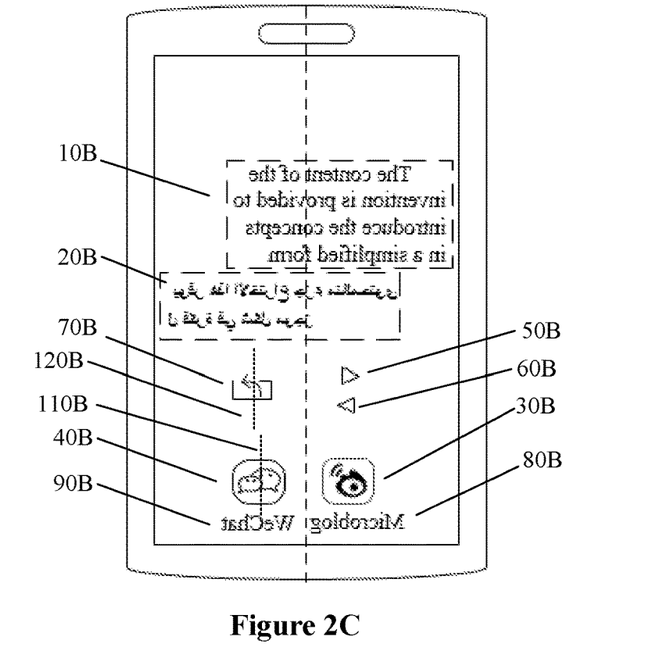
FIG. 2C is a schematic diagram of a first interface corresponding to the LTR interface shown in FIG. 2B.

Exemplarily, FIG. 2A shows an LTR interface according to an exemplary embodiment. A first interface shown in FIG. 2B may be obtained by performing mirror flipping on the LTR interface around a symmetry axis 100A (as shown in FIG. 2A) of the LTR interface. For example, after performing mirror flipping, a text element of "The content of the invention is provided to introduce the concepts in a simplified form." 10A shown in FIG. 2A is changed to a text element of "The content of the invention is provided to introduce the concepts in a simplified form." 10B shown in FIG. 2B. That is, the text element of "The content of the invention is provided to introduce the concepts in a simplified form." 10B shown in FIG. 2B is a mirror image of the text element of "The content of the invention is provided to introduce the concepts in a simplified form." 10A shown in FIG. 2A. After performing mirror flipping, a text element of "Microblog" 80A shown in FIG. 2A is changed to a text element of "Microblog" 80B shown in FIG. 2B. That is, the text element of "Microblog" 80B shown in FIG. 2B is a mirror image of the text element of "Microblog" 80A shown in FIG. 2A. After performing mirror flipping, an icon 30A of the microblog shown in FIG. 2A is changed to an icon 30B of the microblog shown in FIG. 2B. That is, the icon 30B of the microblog shown in FIG. 2B is a mirror image of the icon 30A of the microblog shown in FIG. 2A. After performing mirror flipping, a page-to-left icon 50A shown in FIG. 2A is changed to a page-to-left icon 50B shown in FIG. 2B. That is, the page-to-left icon 50B shown in FIG. 2B is a mirror image of the page-to-left icon 50A shown in FIG. 2A.

In step 102, a first target element in the first interface is determined.

In the present disclosure, the first target element may be an element always in forward display relative to the display screen of the terminal. Forward display is opposite to reverse display. That is, a direction of an element in reverse display is opposite to a direction of the element in forward display. After performing mirror flipping on an element in forward display around a symmetry axis of the element, a corresponding element in reverse display is obtained. For example, the text element of "The content of the invention is provided to introduce the concepts in a simplified form." 10A shown in FIG. 2A is in forward display, and the text element of "The content of the invention is provided to introduce the concepts in a simplified form." 10B shown in FIG. 2B is in reverse display.

Exemplarily, the first target element may be a text element and/or a first icon element.

For example, as shown in FIG. 2B, the text element of "The content of the invention is provided to introduce the concepts in a simplified form." 10B, the text element of "الـمـحـتـوى مـن جـزء الاخـر تـراع هذا يـوفـر" مـوجـز شـكـل فـي فـ كرةـ ـل ت قـديـ م" 20B (that is, an Arabic version of "The content of the invention is provided to introduce the concepts in a simplified form." 10B), the text element of "Microblog" 80B, and the text element of "WeChat" 90B are all first target elements. In the RTL interface, text elements in Arabic are displayed from right to left and right-aligned (for example, the text element of "الـمـحـتـوى مـن جـزء الاخـر تـراع هذا يـوفـر مـوجـز شـكـل فـي فـ كرةـ ـل ت قـديـ م" 20B shown in FIG. 2B), and text elements in other languages are displayed from left to right and left-aligned (for example, the text element of "The content of the invention is provided to introduce the concepts in a simplified form." 10B shown in FIG. 2B).

The first icon element may be an icon without a direction indicator. For example, a video cover, and the icon 30B of the microblog, an icon 40B of the WeChat and a sharing icon 70B shown in FIG. 2B are all first icon elements. That is, the video cover, and the icon 30B of the microblog, the icon 40B of the WeChat and the sharing icon 70B shown in FIG. 2B are all first target elements.

In addition, the first target element may further include one or more of a virtual keyboard, a status bar (in which icons such as a battery power icon, a time icon, and a network icon are displayed), an album selection page, and other pages called in the current user interface.

In addition, the user may set the first target element according to reading habits of the user. For example, the user may set an element, such as a video playback module (where the video playback module includes a video playback frame and a video playback screen), a camera view of a recording page, as the first target element.

In the present disclosure, the first target element may be determined in various ways.

Figure 3A:
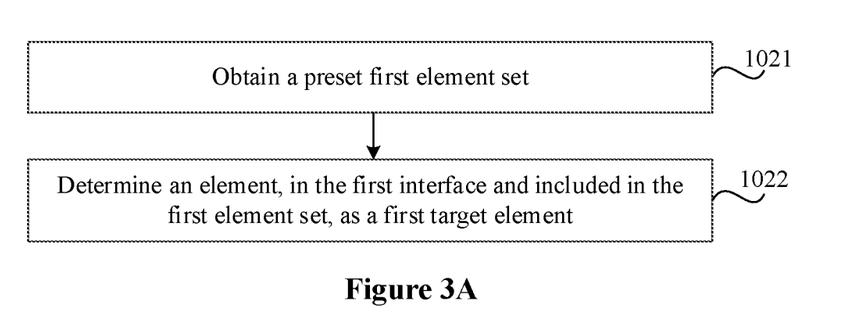
FIG. 3A is a flow chart of a method for determining a first target element according to an exemplary embodiment.

In an embodiment, the first target element may be determined by performing the steps 1021 and 1022 shown in FIG. 3A.

In step 1021, a preset first element set is obtained.

In step 1022, an element, in the first interface and included the first element set, is determined as the first target element.

In the present disclosure, the preset first element set includes elements that are always in forward display relative to the display screen of the terminal. That is, for an element in the first interface and included in the present first element set, the element is in reverse display in the first interface due to that mirror flipping has been performed on the element, and it is required to perform mirror flipping on the element again to display the element forward. The preset first element set may include an element such as a text element, a first icon element, a virtual keyboard, a status bar, an album selection page, other pages called in a current user interface, a video playback module, and a camera view of a recording page. The terminal may be arranged with a first storage module to store the preset first element set. Thus, the preset first element set may be obtained by accessing the first storage module.

After obtaining the first element set, for each of elements in the first interface, it may be determined whether the element is included in the first element set, and the element is determined as the first target element in a case that the element is included the first element set.

Figure 3B:
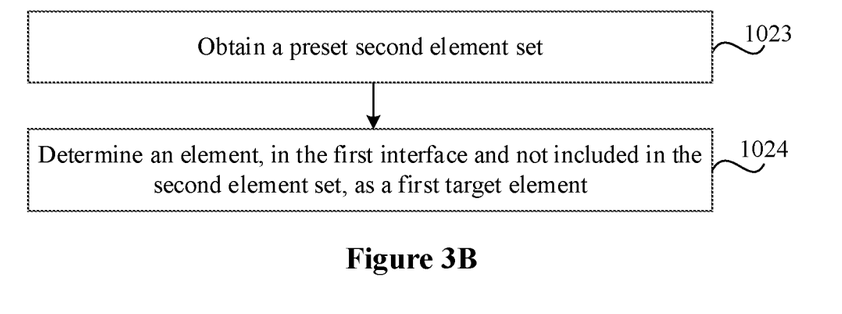
FIG. 3B is a flow chart of a method for determining a first target element according to another exemplary embodiment.

In another embodiment, the first target element may be determined by performing steps 1023 and 1024 shown in FIG. 3B.

In step 1023, a preset second element set is obtained.

In the present disclosure, the preset second element set includes elements that are unnecessarily in forward display relative to the display screen of the terminal. That is, for an element in the first interface and included in the second element set, even though the element is in reversed display, it is unnecessary to perform mirror flipping on the element again. The preset second element set may include a second icon element. The second icon element may be an icon with a direction indicator. For example, a back arrow button, the page-to-left icon 50B and the page-to-right icon 60B shown in FIG. 2B are all second icon elements. The terminal may be arranged with a second storage module to store the preset second element set. Thus, the preset second element set may be obtained by accessing the second storage module.

In step 1024, an element, in the first interface and not included in the second element set, is determined as the first target element.

After obtaining the second element set in step 1023, an element, in the first interface and not included in the second element set, may be determined as the first target element.

In another embodiment, the first interface may include a first parent element and a first child element. Specifically, the first target element may be determined by performing steps 1025 and 1026 shown in FIG. 3C.

Figure 3C:
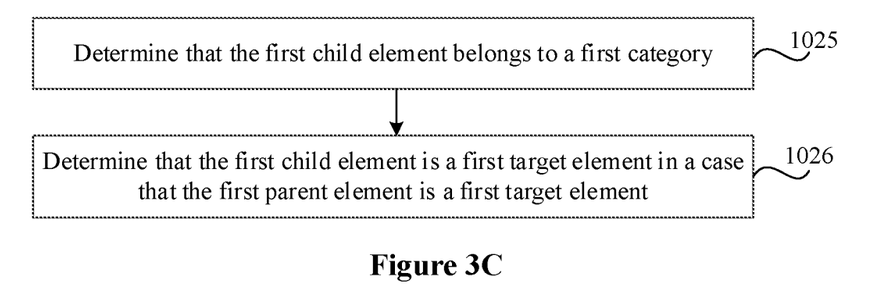
FIG. 3C is a flow chart of a method for determining a first target element according to another exemplary embodiment.

In step 1025, it is determined that the first child element belongs to a first category.

In step 1026, in a case that the first parent element is the first target element, the first child element is determined as the first target element.

In the present disclosure, feature categories of the elements in the first interface may include a first category, a second category, a third category, a fourth category, and a fifth category. For example, the first category is an Inherit category. That is, if a parent element of a child element is a first target element, the child element is also a first target element. The second category is a Normal With All Descendants category (an overall forward category). That is, a parent element belonging to the second category and child elements of the parent element are all first target elements. For example, a virtual keyboard (parent element) and all keys on the virtual keyboard (where all the keys on the virtual keyboard are child elements of the parent element "virtual keyboard") may belong to the second category. The third category is a Normal category (a single-layer forward category). That is, child elements belonging to the third category are always in forward display. Each of child elements belonging to the third category is a first target elements, regardless of whether a parent element of the child element is a first target element. For example, a text element, a first icon element, and a video playback module may belong to the third category. The fourth category is a Flip category (a single-layer flipping category). That is, in performing mirror flipping on a to-be-flipped user interface to obtain a second interface, it is only required to perform mirror flipping on an element belonging to the fourth category once. It indicates that a child element belonging to the fourth category is not a first target element, but a second target element. For example, the second icon element may belong to the fourth category. The fifth category is a Flip With All Descendants category (an overall flipping category). That is, in performing mirror flipping on a to-be-flipped user interface to obtain a second interface, it is only required to perform mirror flipping on a parent element belonging to the fifth category and all child elements of the parent element once. It indicates that the parent element belonging to the fifth category and all the child elements of the parent element are not first target elements, but are second target elements.

After obtaining the first interface in step 101, for each of first child elements in the first interface, it is determined whether the first child element belongs to the first category. In a case that the first child element belongs to the first category, it is determined whether a first parent element of the first child element is a first target element. In a case that the first parent element is the first target element, it may be determined that the first child element is the first target element.

In another embodiment, the first interface may include a second parent element and a second child element. Specifically, the first target element may be determined by performing steps 1027 and 1028 shown in FIG. 3D.

Figure 3D:
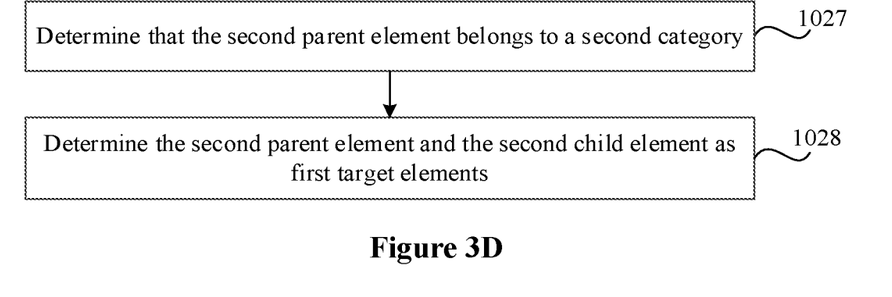
FIG. 3D is a flow chart of a method for determining a first target element according to another exemplary embodiment.

In step 1027, it is determined that the second parent element belongs to a second category.

In step 1028, each of the second parent element and the second child element is determined as the first target element.

In the present disclosure, after obtaining the first interface in the step 101, for each of second parent elements in the first interface, it may be determined whether the second parent element belongs to the second category, and it may be determined that each of the second parent element and the second child element is the first target element in a case that the second parent element belongs to the second category.

In addition, the first interface includes a third parent element and a third child element. After obtaining the first interface in the step 101, for each of third child elements in the first interface, it is determined that the third child element is the first target element in a case that the third child element belongs to a third category.

For each of the first child element, the second child element and the third child element, in a case that the child element belongs to the fourth category or the fifth category, it may be determined that the element is not a first target element, but a second target element.

In the above four embodiments, the first target element is directly determined in the first interface. In addition, the first target element may further be determined in the to-be-flipped user interface. Specifically, in another embodiment, an element that is always in forward display in the to-be-flipped user interface may be determined firstly. Then, a mirror element, in the first interface and corresponding to the element that is always in forward display in the to-be-flipped user interface, is determined as the first target element.

Returning to FIG. 2, in step 103, mirror flipping is performed on the first target element in the first interface around a symmetry axis of the first target element to obtain a second target element and then obtain a second interface.

In the present disclosure, the first target element is always in forward display relative to the display screen of the terminal. However, after performing mirror flipping in the step 101, the first target element is in reverse display, thus it is required to perform mirror flipping on the first target element again to display the first target element forward. Therefore, after obtaining the first interface in the step 101, for each of first target elements in the first interface, mirror flipping may be performed on the first target element, thereby obtaining the second interface (that is, step 103 is performed).

Figure 2D:
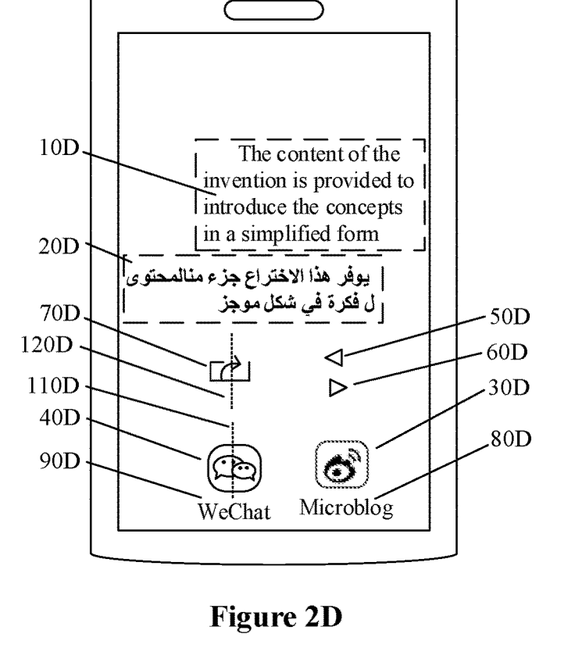
FIG. 2D is a schematic diagram of a second interface corresponding to the first interface shown in FIG. 2C.

Exemplarily, since the page-to-left icon 50B and the page-to-right icon 60B shown in FIG. 2B (or FIG. 2C) are not first target elements, it is unnecessary to perform mirror flipping on the page-to-left icon 50B and the page-to-right icon 60B (as shown in FIG. 2D). The text element of "The content of the invention is provided to introduce the concepts in a simplified form." 10B, the text element of الـمـحـتـوى مـن جـزءالأخـد تـراع هـا د وفـ ر 20B, the text element of "موجز شكل ف يـ فـ كـرة لـ تـقـديـم" 80B, the text element of "Microblog" 80B, the text element of "WeChat" 90B, the icon 30B of the microblog, the icon 40B of the WeChat and the sharing icon 70B shown in FIG. 2B (or FIG. 2C) are all first target elements. For each of the first target elements, mirror flipping may be performed on the first target element around a symmetry axis of the first target element, thereby obtaining the second interface shown in FIG. 2D. Exemplarily, after performing mirror flipping on the sharing icon 70B shown in FIG. 2C around the symmetry axis 120B of the sharing icon 70B, the sharing icon 70D shown in FIG. 2D is obtained. After performing mirror flipping on the icon 40B of the WeChat shown in FIG. 2C around the symmetry axis 110B of the icon 40B of the WeChat, the icon 40D of the WeChat shown in FIG. 2D is obtained.

In step 104, the second interface is displayed.

After obtaining the second interface in step 103, the second interface may be displayed to the user.

In the above technical solutions, mirror flipping is performed on the to-be-flipped user interface around the symmetry axis of the user interface to obtain the first interface, then mirror flipping is performed on the first target element in the first interface around the symmetry axis of the first target element to obtain the second interface, and then the second interface is displayed. Therefore, the user interface is flipped by performing mirror flipping to adapt to the user's reading habits, simple and easy to be implemented, without rewriting codes, saving time and labor costs, flipping the user interface without restarting an application, convenient and fast, thereby improving the user experience.

Figure 4:
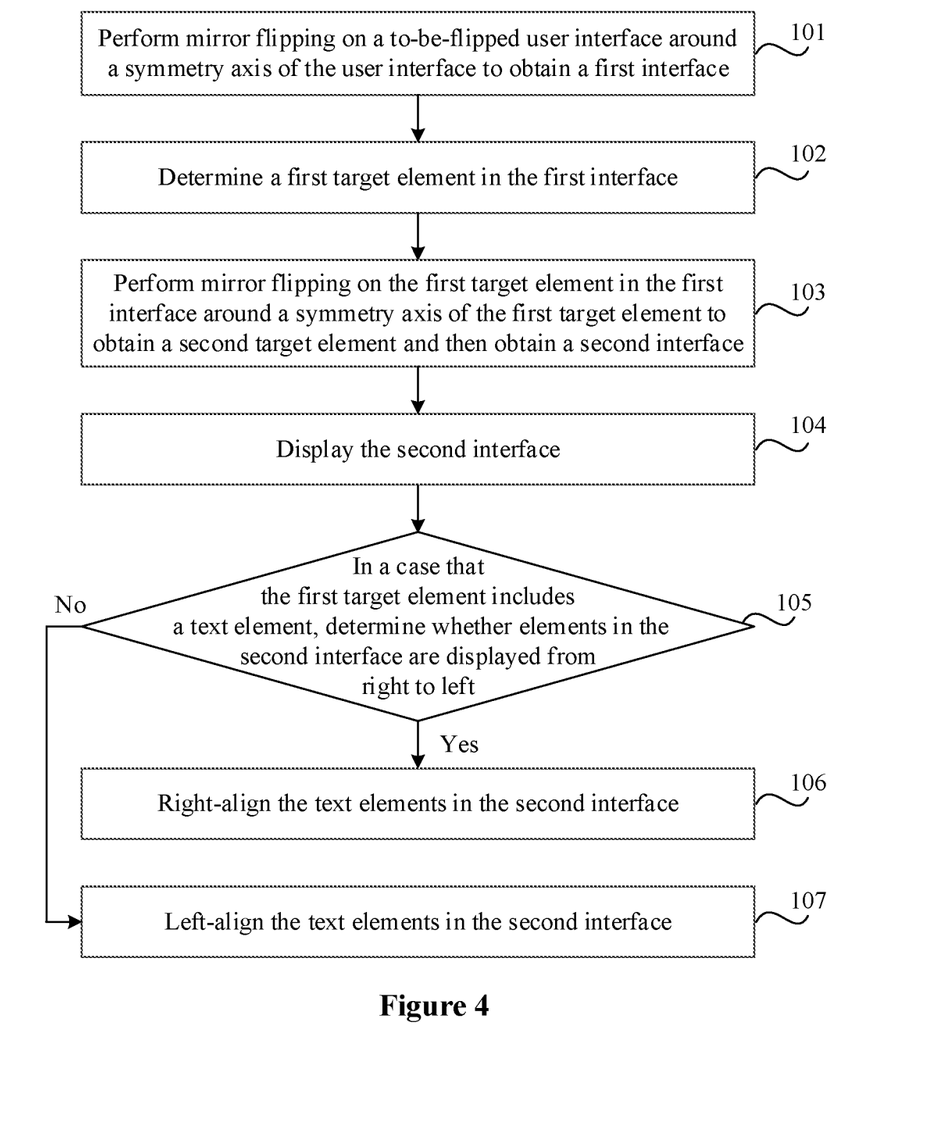
FIG. 4 is a flow chart of a method for displaying a user interface according to another exemplary embodiment.

FIG. 4 is a flow chart of a method for displaying a user interface according to another exemplary embodiment. As shown in FIG. 4, the method may further include the following steps 105 to 107.

In step 105, in a case that the first target element includes a text element, it is determined whether elements in the second interface are displayed from right to left.

In the present disclosure, in a case that the elements in the to-be-flipped user interface are displayed from left to right, the text element is left-aligned. After performing mirror flipping respectively in steps 101 and 103, the text element is still left-aligned. That is, in a second interface, corresponding to the to-be-flipped user interface, in which elements are displayed from right to left, the elements are left-aligned. Exemplarily, after performing mirror flipping on the text element of "The content of the invention is provided to introduce the concepts in a simplified form." 10A shown in FIG. 2A twice, a text element of "The content of the invention is provided to introduce the concepts in a simplified form." that is left-aligned as shown in FIG. 2D is obtained.

However, elements in the second interface are displayed from right to left, thus it is required to right-align the text element. Thus, in a cast that it is determined in the step 102 that the first target element includes a text element, it is required to right-align the text element. Similarly, in a case that elements in the to-be-flipped user interface are displayed from right to left, the text element is right-aligned, and after performing mirror flipping twice in steps 101 and 103, the text element is still right-aligned. That is, in a second interface, corresponding to the to-be-flipped user interface, in which elements are displayed from left to right, elements are right-aligned. However, elements in the second interface are displayed from left to right, thus it is required to left-align the text element. Thus, in a cast that it is determined in the step 102 that the first target element includes a text element, it is required to left-align the text element. That is, in a case that it is determined in step 102 that the first target element includes a text element, a display mode in the second interface is determined, and then an alignment mode of the text element is adjusted according to the display mode. Specifically, in a case that the elements in the second interface are displayed from right to left, text elements in the second interface may be right-aligned, that is, the following step 106 is performed; and in a case that the elements in the second interface are displayed from left to right, text elements in the second interface may be left-aligned, that is, the following step 107 is performed.

Figure 2E:
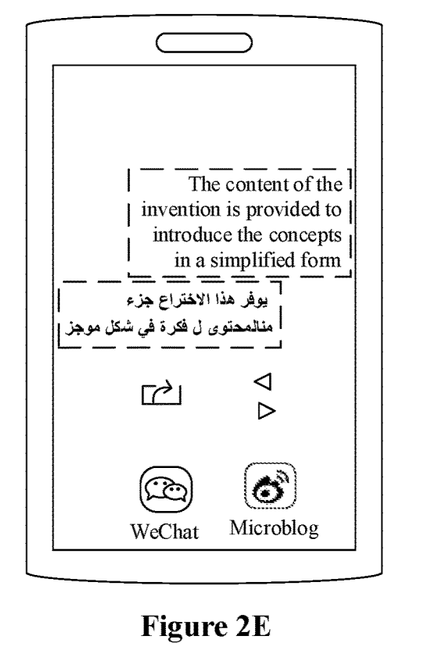
FIG. 2E is a schematic diagram of the second interface shown in FIG. 2D after right-aligning a text element.

Exemplarily, since the elements in the second interface shown in FIG. 2D are displayed from right to left, it is required to right-align the text elements (including the text element of "The content of the invention is provided to introduce the concepts in a simplified form." 10, the text element of "من جزء الاخ تراع هذا يوفر" 20, "موجز شكل ف ي ف كرة ل ت قدي م ال م حد توى" the text element of "Microblog" 80, and the text element of "WeChat" 90) to obtain an interface in which elements are displayed from right to left as shown in FIG. 2E.

In step 106, the text elements in the second interface are right-aligned.

In step 107, the text elements in the second interface are left-aligned.

Figure 5:
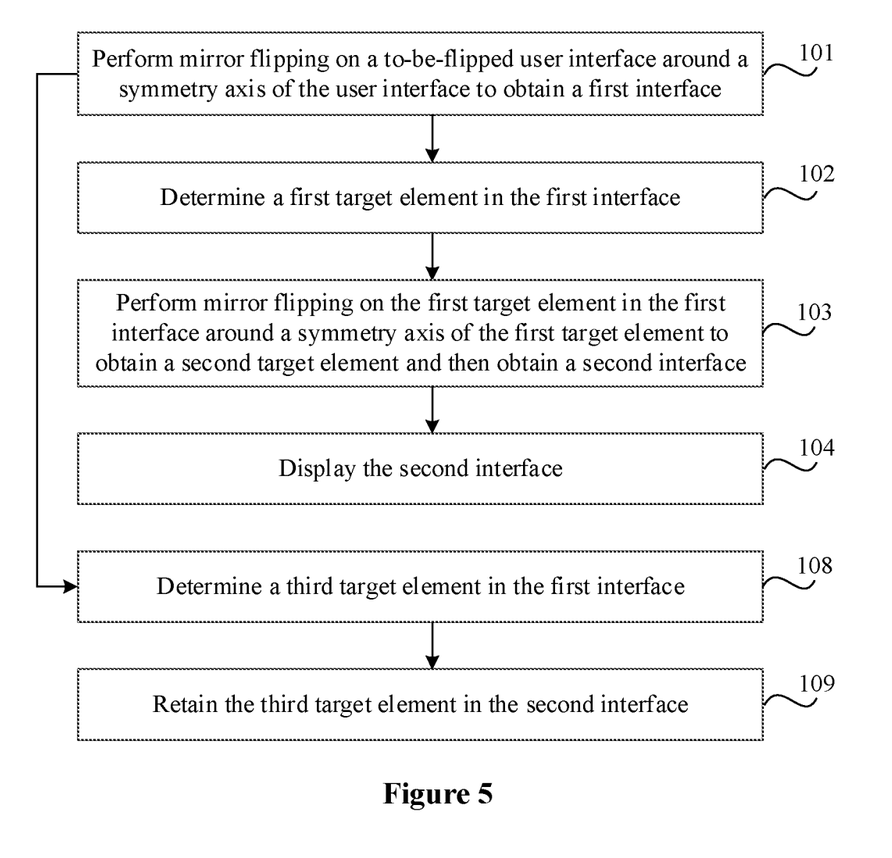
FIG. 5 is a flow chart of a method for displaying a user interface according to another exemplary embodiment.

FIG. 5 is a flow chart of a method for displaying a user interface according to another exemplary embodiment. As shown in FIG. 5, the method may further include the following steps 108 and 109.

In step 108, a third target element in the first interface is determined.

In the present disclosure, the third target element may be an element displayed in reverse. For example, the third target element may be a second icon element. For example, a back arrow button, the left-swiping icon 50 and the right-swiping icon 60 shown in FIG. 2A are all third target elements.

In the present disclosure, an element, other than the third target element, in the first interface may be determined as the second target element.

In step 109, the third target element is retained in the second interface.

After the third target element is determined, the third target element may be retained in the second interface, so that the user may intuitively see the element in reverse display.

In addition, it should be noted that step 108 may be performed before step 102, or may be performed after step 102, or may be performed simultaneously with step 102, which is not limited in the present disclosure.

Figure 6:
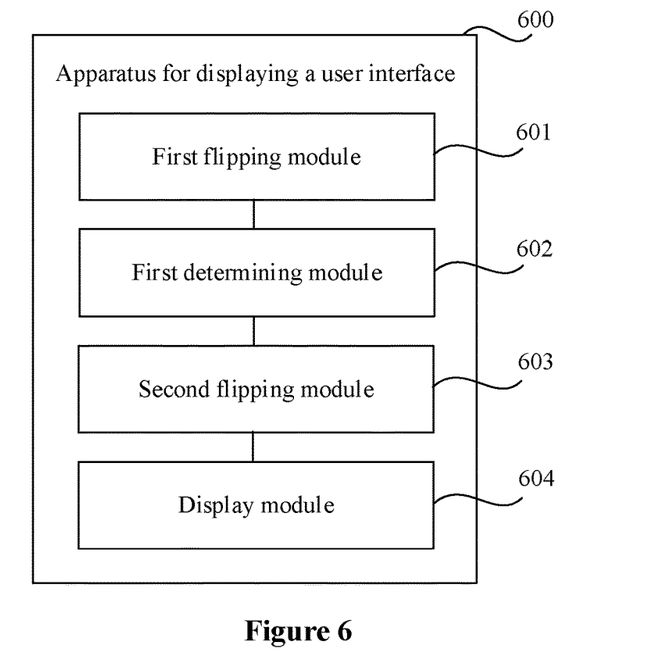
FIG. 6 is a block diagram of an apparatus for displaying a user interface according to an exemplary embodiment.

FIG. 6 is a block diagram of an apparatus for displaying a user interface according to an exemplary embodiment. Referring to FIG. 6, the apparatus 600 includes: a first flipping module 601, a first determining module 602, a second flipping module 603, and a display module 604. The first flipping module 601 is configured to perform mirror flipping on a to-be-flipped user interface around a symmetry axis of the user interface to obtain a first interface. The first determining module 602 is configured to determine a first target element in the first interface obtained by the first flipping module 601. The second flipping module 603 is configured to perform mirror flipping on the first target element, determined by the first determining module 602, in the first interface around a symmetry axis of the first target element to obtain a second target element and then obtain a second interface. The display module 604 is configured to display the second interface obtained by the second flipping module 603.

In an embodiment, the first target element includes a text element and/or a first icon element. The first icon element is an icon without a direction indicator.

In an embodiment, the first target element further includes one or more of a virtual keyboard, a status bar, and a video playback module.

In an embodiment, the first determining module 602 includes: a first obtaining sub-module and a first determining sub-module. The first obtaining sub-module is configured to obtain a preset first element set. The first determining sub-module is configured to determine an element, in the first interface obtained by the first flipping module 601 and included in the first element set obtained by the first obtaining sub-module, as the first target element.

In an embodiment, the first determining module 602 includes: a second obtaining sub-module and a second determining sub-module. The second obtaining sub-module is configured to obtain a preset second element set. The second determining sub-module is configured to determine an element, in the first interface obtained by the first flipping module 601 and not included in the second element set obtained by the second obtaining sub-module, as the first target element.

In an embodiment, the first interface includes a first parent element and a first child element. The first determining module 602 includes: a third determining sub-module and a fourth determining sub-module. The third determining sub-module is configured to determine that the first child element belongs to a first category. The fourth determining sub-module is configured to determine that the first child element is the first target element in a case that the first parent element is the first target element.

In an embodiment, the first interface includes a second parent element and a second child element. The first determining module 602 includes: a fifth determining sub-module and a sixth determining sub-module. The fifth determining sub-module is configured to determine that the second parent element belongs to a second category. The sixth determining sub-module is configured to determine each of the second parent element and the second child element as the first target element.

Figure 7:
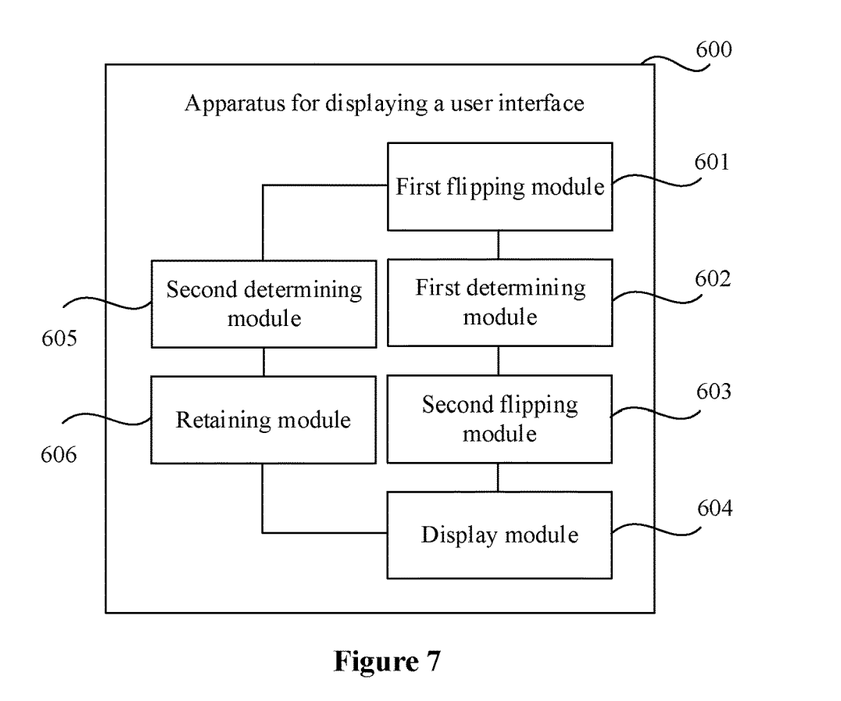
FIG. 7 is a block diagram of an apparatus for displaying a user interface according to another exemplary embodiment.

FIG. 7 is a block diagram of an apparatus for displaying a user interface according to another exemplary embodiment. Referring to FIG. 7, the apparatus 600 may further include: a second determining module 605 and a retaining module 606. The second determining module 605 is configured to determine a third target element in the first interface obtained by the first flipping module 601. The retaining module 606 is configured to retain the third target element in the second interface.

In an embodiment, the second target element includes a second icon element. The second icon element is an icon with a direction indicator.

Figure 8:
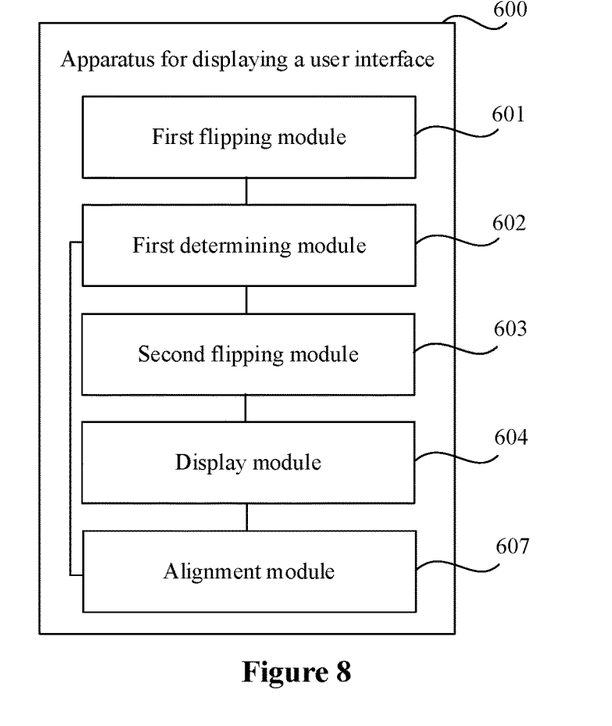
FIG. 8 is a block diagram of an apparatus for displaying a user interface according to another exemplary embodiment.

FIG. 8 is a block diagram of an apparatus for displaying a user interface according to another exemplary embodiment. Referring to FIG. 8, the apparatus 600 may further include an alignment module 607. The alignment module 607 is configured to, in a case that the first target element determined by the first determining module 602 includes a text element, right-align the text element in the second interface obtained by the second flipping module 604 if elements in the second interface are displayed from right to left, and left-align the text element in the second interface if elements in the second interface are displayed from left to right.

For the apparatus according to the above embodiments, the manners in which modules of the apparatus perform operations have been described in detail in the method embodiments, and are not to be described in detail herein.

According to the present disclosure, a computer-readable medium is further provided. The computer-readable medium stores a computer program. The computer program, when executed by a processing device, causes the processing device to perform the right-to-left layout method in the user interface according to the present disclosure.

Hereinafter, reference is made to FIG. 9, which shows a schematic structural diagram of an electronic device 900 (such as a terminal) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 9 is only exemplary, and should not indicate any limitation to the function and application scope of the embodiments of the present disclosure.

Figure 9:
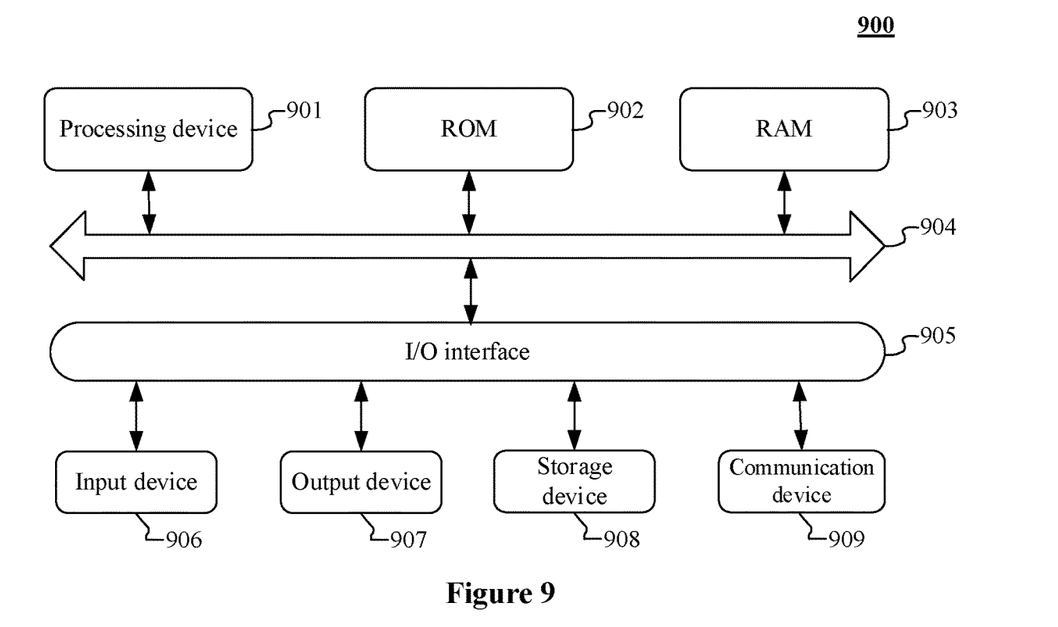
FIG. 9 is a schematic structural diagram of an electronic device according to an exemplary embodiment.

As shown in FIG. 9, the electronic device 900 may include a processing device 901 (such as a central processing unit and a graphics processor) which may execute various operations and processing through a program stored in a Read Only Memory (ROM) 902 or a program loaded from the storage device 908 into a Random Access Memory (RAM) 903. The RAM 903 is further configured to store various programs and data required by the electronic device 800. The processing device 901, the ROM 902 and the RAM 903 are connected to each other through a bus 904. An Input/output (I/O) interface 905 is also connected to the bus 904.

Generally, the I/O interface 905 may be connected to: an input device 906, such as a touch screen, a touch panel, a keyboard, a mouse, a camera, a microphone, an accelerometer, and a gyroscope; an output device 907, such as a liquid crystal display (LCD), a speaker, and a vibrator; a storage device 908 such as a magnetic tape and a hard disk; and a communication device 909. The communication device 909 enables the electronic device 900 to perform wireless or wired communication with other devices for data exchanging. Although FIG. 9 shows an electronic device 900 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided in an embodiment in the present disclosure, including a computer program carried on a non-transitory computer readable medium. The computer program includes program codes for performing the method shown in the flow charts. In the embodiment, the computer program may be downloaded and installed from the network via the communication device 909, or installed from the storage device 908, or installed from the ROM 902. When the computer program is executed by the processing device 901, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device.

The computer readable medium carries one or more programs. The one or more programs, when being executed by the electronic device, cause the electronic device to: perform mirror flipping on a to-be-flipped user interface around a symmetry axis of the user interface to obtain a first interface; determine a first target element in the first interface; perform mirror flipping on the first target element in the first interface around a symmetry axis of the first target element to obtain a second target element and then obtain a second interface; and display the second interface.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The modules mentioned in the description of the embodiments of the present disclosure may be implemented by means of software, or otherwise by means of hardware. In some circumstances, the name of a module does not constitute a limitation on the module itself. For example, a first flipping module may also be described as "a module that performs mirror flipping on a to-be-flipped user interface around a symmetry axis of the user interface".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

According to one or more embodiments of the present disclosure, in an example 1, a method for displaying a user interface is provided. The method includes: performing mirror flipping on a to-be-flipped user interface around a symmetry axis of the user interface to obtain a first interface; determining a first target element in the first interface; performing mirror flipping on the first target element in the first interface around a symmetry axis of the first target element to obtain a second target element and then obtain a second interface; and displaying the second interface.

According to one or more embodiments of the present disclosure, in an example 2 based on the example 1, the first target element includes a text element and/or a first icon element, and the first icon element is an icon without a direction indicator.

According to one or more embodiments of the present disclosure, in an example 3 based on the example 1, the first target element further includes one or more of a virtual keyboard, a status bar, and a video playback module.

According to one or more embodiments of the present disclosure, in an example 4 based on the example 1, the determining a first target element in the first interface includes: obtaining a preset first element set; and determining an element, in the first interface and included in the first element set, as the first target element.

According to one or more embodiments of the present disclosure, in an example 5 based on the example 1, the determining a first target element in the first interface includes: obtaining a preset second element set; and determining an element, in the first interface and not included in the second element set, as the first target element.

According to one or more embodiments of the present disclosure, in an example 6 based on the example 1, the first interface includes a first parent element and a first child element; and the determining a first target element in the first interface includes: determining that the first child element belongs to a first category; and determining that the first child element is the first target element in a case that the first parent element is the first target element.

According to one or more embodiments of the present disclosure, in an example 7 based on the example 1, the first interface includes a second parent element and a second child element; and the determining a first target element in the first interface includes: determining that the second parent element belongs to a second category; and determining each of the second parent element and the second child element as the first target element.

According to one or more embodiments of the present disclosure, in an example 8 based on the example 1, the method further includes: determining a third target element in the first interface; and retaining the third target element in the second interface.

According to one or more embodiments of the present disclosure, in an example 9 based on the example 8, the third target element includes a second icon element, and the second icon element is an icon with a direction indicator.

According to one or more embodiments of the present disclosure, in an example 10 based on any one of examples 1 to 9, in a case that the first target element includes a text element, the method further includes: in a case that elements in the second interface are displayed from right to left, right-aligning the text element in the second interface; and in a case that elements in the second interface are displayed from left to right, left-aligning the text element in the second interface.

According to one or more embodiments of the present disclosure, in an example 11, an apparatus for displaying a user interface is provided. The apparatus includes: a first flipping module configured to perform mirror flipping on a to-be-flipped user interface around a symmetry axis of the user interface to obtain a first interface; a first determining module configured to determine a first target element in the first interface obtained by the first flipping module; a second flipping module configured to perform mirror flipping on the first target element in the first interface around a symmetry axis of the first target element to obtain a second target element and then obtain a second interface; and a display module configured to display the second interface obtained by the second flipping module.

According to one or more embodiments of the present disclosure, in an example 12 based on the example 11, the first target element includes a text element and/or a first icon element, and the first icon element is an icon without a direction indicator.

According to one or more embodiments of the present disclosure, in an example 13 based on the example 11, the first target element further includes one or more of a virtual keyboard, a status bar, and a video playback module.

According to one or more embodiments of the present disclosure, in an example 14 based on the example 11, the first determining module includes: a first obtaining sub-module configured to obtain a preset first element set; and a first determining sub-module configured to determine an element, in the first interface obtained by the first flipping module and included in the first element set obtained by the first obtaining sub-module, as the first target element.

According to one or more embodiments of the present disclosure, in an example 15 based on the example 11, the first determining module includes: a second obtaining sub-module configured to obtain a preset second element set; and a second determining sub-module configured to determine an element, in the first interface obtained by the first flipping module and not included in the second element set obtained by the second obtaining sub-module, as the first target element.

According to one or more embodiments of the present disclosure, in an example 16 based on the example 11, the first interface includes a first parent element and a first child element; and the first determining module includes: a third determining sub-module configured to determine that the first child element belongs to a first category; and a fourth determining sub-module configured to determine that the first child element is a first target element in a case that the first parent element is a first target element.

According to one or more embodiments of the present disclosure, in an example 17 based on the example 11, the first interface includes a second parent element and a second child element; and the first determining module includes: a fifth determining sub-module configured to determine that the second parent element belongs to a second category; and a sixth determining sub-module configured to determine each of the second parent element and the second child element as the first target element.

According to one or more embodiments of the present disclosure, in an example 18 based on the example 11, the apparatus further includes: a second determining module configured to determine a third target element in the first interface obtained by the first flipping module; and a retaining module configured to retain the third target element in the second interface.

According to one or more embodiments of the present disclosure, in an example 19 based on the example 18, the third target element includes a second icon element, and the second icon element is an icon with a direction indicator.

According to one or more embodiments of the present disclosure, in an example 20 based on any one of the examples 11 to 19, the apparatus further includes: an alignment module, configured to, in a case that the first target element determined by the first determining module includes a text element, right-align the text element in the second interface obtained by the second flipping module if elements in the second interface are displayed from right to left, and left-align the text element in the second interface if elements in the second interface are displayed from left to right.

According to one or more embodiments of the present disclosure, in an example 21, a computer-readable medium is provided. The computer-readable medium stores a computer program. The computer program, when executed by a processing device, causes the processing device to perform the method in any one of examples 1 to 10.

According to one or more embodiments of the present disclosure, in an example 22, an electronic device is provided. The electronic device includes a storage device and a processing device. The storage device stores a computer program. The processing device, configured to perform, when executing the computer program stored in the storage device, the method in any one of examples 1 to 10.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims. For the apparatus according to the above embodiments, the manners in which modules of the apparatus perform operations have been described in detail in the method embodiments, and are not to be described in detail herein.

The invention claimed is:

1. A method for displaying a user interface, comprising:
performing mirror flipping on a user interface around a symmetry axis of the user interface to obtain a first interface;
determining a first target element in the first interface, wherein the mirror flipping of the user interface around the symmetry axis of the user interface results in the first target element being in reverse display relative to a display screen, wherein a display direction of the first target element, according to reading habits of users, is in forward display relative to the display screen, and wherein a direction of the first target element in the reverse display is opposite to a direction of the first target element in the forward display;
performing mirror flipping on the first target element in the first interface around a symmetry axis of the first target element, wherein the mirror flipping on the first target element around the symmetry axis of the first target element results in the first target element being in the forward display; and
displaying a second interface that is obtained based on performing the mirror flipping on the first target element around the symmetry axis of the first target element.

2. The method according to claim 1, wherein the first target element comprises at least one of a text element or a first icon element, and the first icon element is an icon without a direction indicator.

3. The method according to claim 2, wherein the first target element further comprises at least one of a virtual keyboard, a status bar, or a video playback module.

4. The method according to claim 1, wherein the determining a first target element in the first interface comprises:
obtaining a preset first element set; and
determining an element, in the first interface and comprised in the first element set, as the first target element.

5. The method according to claim 1, wherein the determining a first target element in the first interface comprises:
obtaining a preset second element set; and
determining an element, in the first interface and not comprised in the second element set, as the first target element.

6. The method according to claim 1, wherein
the first interface comprises a first parent element and a first child element; and
the determining a first target element in the first interface comprises:
determining that the first child element belongs to a first category; and
determining the first child element as the first target element in a case that the first parent element is the first target element.

7. The method according to claim 1, wherein
the first interface comprises a second parent element and a second child element; and
the determining a first target element in the first interface comprises:
determining that the second parent element belongs to a second category; and
determining each of the second parent element and the second child element as the first target element.

8. The method according to claim 1, further comprising:
determining a third target element in the first interface; and
retaining the third target element in the second interface.

9. The method according to claim 8, wherein the third target element comprises a second icon element, and the second icon element is an icon with a direction indicator.

10. The method according to claim 1, wherein in a case that the first target element comprises a text element, the method further comprises:
in a case that elements in the second interface are displayed from right to left, right-aligning the text element in the second interface; and
in a case that elements in the second interface are displayed from left to right, left-aligning the text element in the second interface.

11. An apparatus for displaying a user interface, comprising:
one or more processors; and
a memory configured to store one or more programs;
wherein when the one or more programs are executed by the one or more processors, the one or more processors are caused to perform operations of:
performing mirror flipping on a user interface around a symmetry axis of the user interface to obtain a first interface;
determining a first target element in the first interface, wherein the mirror flipping of the user interface around the symmetry axis of the user interface results in the first target element being in reverse display relative to a display screen, wherein a display direction of the first target element, according to reading habits of users, is in forward display relative to the display screen, and wherein a direction of the first target element in the reverse display is opposite to a direction of the first target element in the forward display;
performing mirror flipping on the first target element in the first interface around a symmetry axis of the first target element, wherein the mirror flipping on the first target element around the symmetry axis of the first target element results in the first target element being in the forward display; and
displaying a second interface that is obtained based on performing the mirror flipping on the first target element around the symmetry axis of the first target element.

12. The apparatus according to claim 11, wherein the first target element comprises at least one of a text element or a first icon element, and the first icon element is an icon without a direction indicator.

13. The apparatus according to claim 12, wherein the first target element further comprises at least one of a virtual keyboard, a status bar, or a video playback module.

14. The apparatus according to claim 11,
wherein the determining a first target element in the first interface comprises:
obtaining a preset first element set; and
determining an element, in the first interface and comprised in the first element set, as the first target element.

15. The apparatus according to claim 11, wherein the determining a first target element in the first interface comprises:
obtaining a preset second element set; and
determining an element, in the first interface and not comprised in the second element set, as the first target element.

16. The apparatus according to claim 11, wherein the first interface comprises a first parent element and a first child element; and
- the determining a first target element in the first interface comprises:
- determining that the first child element belongs to a first category; and
- determining the first child element as the first target element in a case that the first parent element is the first target element.

17. The apparatus according to claim 11, wherein the first interface comprises a second parent element and a second child element; and
- the determining a first target element in the first interface comprises:
- determining that the second parent element belongs to a second category; and
- determining each of the second parent element and the second child element as the first target element.

18. The apparatus according to claim 11, wherein the one or more processors are caused to perform operations of:
- determining a third target element in the first interface; and
- retaining the third target element in the second interface; and
- the third target element comprises a second icon element, and the second icon element is an icon with a direction indicator.

19. The apparatus according to claim 11, wherein in a case that the first target element comprises a text element, the one or more processors are caused to perform operations of:
- in a case that elements in the second interface are displayed from right to left, right-aligning the text element in the second interface; and
- in a case that elements in the second interface are displayed from left to right, left-aligning the text element in the second interface.

20. A non-transitory computer-readable medium, storing a computer program, wherein the computer program, when executed by a processing device, causes the processing device to perform operations of:
- performing mirror flipping on a user interface around a symmetry axis of the user interface to obtain a first interface;
- determining a first target element in the first interface, wherein the mirror flipping of the user interface around the symmetry axis of the user interface results in the first target element being in reverse display relative to a display screen, wherein a display direction of the first target element, according to reading habits of users, is in forward display relative to the display screen, and wherein a direction of the first target element in the reverse display is opposite to a direction of the first target element in the forward display;
- performing mirror flipping on the first target element in the first interface around a symmetry axis of the first target element, wherein the mirror flipping on the first target element around the symmetry axis of the first target element results in the first target element being in the forward display; and
- displaying a second interface that is obtained based on performing the mirror flipping on the first target element around the symmetry axis of the first target element.

\* \* \* \* \*